United States Patent [19]

Goodman

[11] 4,300,483
[45] Nov. 17, 1981

[54] ELECTRONICALLY CONTROLLED FLUID INJECTION SYSTEM FOR AN INTERNAL COMBUSTION ENGINE

[75] Inventor: Toronita P. Goodman, Summit Point, W. Va.

[73] Assignee: The Goodman System Company, Inc., Armonk, N.Y.

[21] Appl. No.: 118,239

[22] Filed: Feb. 4, 1980

[51] Int. Cl.³ .................. F02B 47/00; F02B 47/02; F02B 47/08
[52] U.S. Cl. .................. 123/25 J; 123/25 A; 123/25 K; 123/25 L; 123/25 M
[58] Field of Search .................. 123/25 J, 25 K, 25 L, 123/25 M, 25 A, 25 R; 261/18 A, DIG. 66

[56] References Cited

U.S. PATENT DOCUMENTS

| | | | |
|---|---|---|---|
| 3,490,422 | 1/1970 | Bullis | 123/25 R |
| 3,500,802 | 3/1970 | Long | 123/484 |
| 3,631,843 | 1/1972 | Yeiser et al. | 123/25 L |
| 3,737,681 | 6/1973 | Rothermel | 307/246 |
| 3,857,543 | 12/1974 | McKeen | 251/129 |
| 3,911,871 | 10/1975 | Williams et al. | 123/25 K |
| 3,930,470 | 1/1976 | Douglas | 123/25 A |
| 4,051,815 | 10/1977 | Coberley | 123/25 A |
| 4,096,829 | 6/1978 | Spears | 125/25 J |
| 4,141,323 | 2/1979 | Hart | 123/25 M |
| 4,191,134 | 3/1980 | Goodman | 123/25 J |

Primary Examiner—Charles J. Myhre
Assistant Examiner—E. Rollins Cross
Attorney, Agent, or Firm—Lane, Aitken, Kice & Kananen

[57] ABSTRACT

A fluid injection system for an internal combustion engine such as a spark-ignition or compression-ignition enginein which an injection nozzle injects a finely divided spray of fluid, such as water or a water solution, into the engine in response to a flow of atomizing air. The nozzle is connected to a fluid supply reservoir and to the outlet line of an air-injection pump connected to the intake manifold of the engine and to an electronic circuit that includes an inductive pick-up coupled to the ignition system of the engine. The pump operates in response to engine speed by virtue of its connection to the ignition system and in response to engine load by virtue of its connection to the intake manifold. As a result, the flow of atomizing air to the nozzle and therefore the rate and magnitude of water injection is responsive to engine speed and engine load.

15 Claims, 8 Drawing Figures

ELECTRONICALLY CONTROLLED FLUID INJECTION SYSTEM FOR AN INTERNAL COMBUSTION ENGINE

BACKGROUND OF THE INVENTION

The present invention relates to a system for injecting a fluid, such as water or a water solution, into internal combustion engines and, more specifically, to a fluid injection system and method for injecting fluid into spark-ignition engines in which the injection rate is proportional to the engine speed and engine load.

Various cooling fluids, such as water and water in solution with other substances, such as methanol or alcohol, have been commonly injected into hydrocarbon engines, both of the spark-ignition and compression-ignition type, to provide improved engine operation. The fluid absorbs heat within the combustion chamber and provides for an even burning rate to prevent, or at least greatly minimize, detonation of the fuel charge in the combustion chamber. In addition, the fluid tends to diminish the accumulation of carbon deposits within the combustion chamber and, because the combustion process takes place at a generally lower temperature, inhibits the formation of high-temperature pollutants, specifically the oxides of nitrogen ($NO_x$).

Various types of prior devices have been used to introduce cooling fluids into the intake air of internal combustion engines. These devices have included nozzle-type injectors in which the fluid is pumped directly into the engine, and intake air humidifiers in which air is passed through a volume of water before being introduced into the engine. However, since the injection of a relative low volume of fluid is desired when compared to the volume of fuel introduced into the engine, it is difficult, if not impossible, to meter the fluid with the precision needed to insure optimum performance when it is pumped directly into the engine. Also, if humidified air is used much less heat absorption is obtained when compared to water, since the humidifier air is much less dense than water.

These prior devices suffer from additional problems, since they are usually operated solely by engine speed, directly by the exhaust gases from the engine, or either directly or indirectly in response to engine intake manifold pressure. Although these techniques result in a fluid injection rate that may be adequate under certain engine operating conditions, such as a constant-speed cruise condition, the injection rate during other engine operating conditions, such as acceleration and deceleration, may be too little or too much. When the fluid injection rate is insufficient, the beneficial effects of the cooling fluid are, of course, not obtained. Conversely, when the injection rate is too high, the surplus fluid within the combustion chamber tends to quench the combustion process and, of course, diminish engine performance.

SUMMARY OF THE INVENTION

It is therefore an object of the present invention to provide a system for injecting a fluid, such as water or a water solution, into the air intake side of an internal combustion engine in response to the flow of atomizing air through a nozzle to obtain a precise metering of the injected fluid.

It is another object of the present invention to provide a fluid injection system of the above type in which the fluid is injected in response to engine speed and engine load.

It is still another object of the present invention to provide a fluid injection system of the above type in which the flow of the atomizing air through the nozzle is controlled in response to spark plug firing rate, which is engine speed responsive, and to the intake manifold pressure which is engine load responsive.

It is still another object of the present invention to provide a fluid injection system of the above type in which a pump is provided for introducing the flow of atomizing air to the nozzle and operates in response to engine speed and engine load.

It is still another object of the present invention to provide a fluid injection system of the above type which is inexpensive to manufacture and which is simple and reliable in operation.

It is a further object of the present invention to provide a fluid injection system of the above type which is easy to install on an internal combustion engines and which is ideally suited for after-market installations on previously manufactured vehicles.

Towards the fulfillment of these and other objects the injection system of the present invention includes a fluid injecting device, such as a jet nozzle, which is located on the air intake side of an engine to introduce fluid in finely divided form into the intake air of the engine. The nozzle is connected to both a supply of cooling fluid and to a source of atomizing air so that the flow of air through the nozzle draws the fluid through the nozzle and into the engine. The atomizing air is supplied by an air-injection pump which is connected to the intake manifold and controlled by the pressure in the intake manifold and to an electronic circuit including a signal pick-up coupled to the engine ignition system. The arrangement is such that the pump is driven, and air therefore introduced to the nozzle, in response to both engine speed and engine load.

BRIEF DESCRIPTION OF THE DRAWINGS

The above brief description, as well as further objects, features and advantages, of the present invention will be more fully appreciated by reference to the following detailed description of presently preferred but nonetheless illustrative embodiments in accordance with the present invention, when taken in conjunction with the accompanying drawings wherein.

DESCRIPTION OF THE PREFERRED EMBODIMENT

Figure 1:
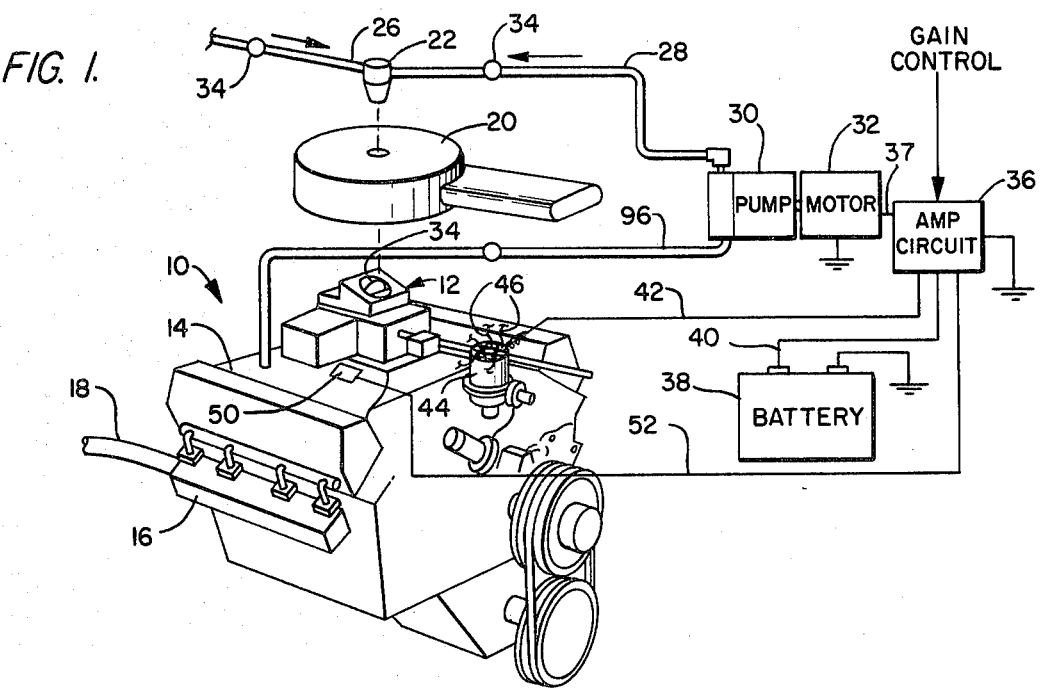
FIG. 1 is an exploded perspective view of an exemplary internal combustion engine equipped with the system of the present invention with certain components being shown schematically and with selected parts of the engine omitted for reasons of clarity.

An exemplary internal combustion engine incorporating the fluid injection system of the present invention is shown in FIG. 1 and is generally referred to by the reference numeral 10. The engine 10 is of conventional design and includes a carburetor 12 mounted on an intake manifold 14 for introducing a fuel/air charge into the combustion chambers of the engine. An exhaust manifold 16 is provided on each side of the engine for directing the exhaust gases produced during the combustion process through an exhaust system 18 (partially shown). An air cleaner, or other plenum, 20 is provided which normally is mounted over the carburetor 12 and which has a opening formed therein for receiving a fluid injection jet, or nozzle, 22 which is adapted to inject cooling fluid, such as water or a water solution, into the intake air side of the engine 10. In the preferred embodiment, the nozzle 22 is mounted in the air cleaner 20 above an inlet opening 24 of the carburetor 12 to direct a downwardly diverging flow of finely divided fluid droplets into the intake air entering the opening 24.

The nozzle 22 is connected to the source of fluid through a hose 26 in a manner to be described in detail later, and is also connected, via a hose 28, to the outlet of a compressor, or air-injection pump 30 connected to and driven by an electric motor 32. One-way valves 34 are provided in hoses 26 and 28 to prevent any reverse flow of fluid and air, respectively, from the nozzle 22. The air supplied through the hose 28 to the nozzle 22 from the outlet of the pump 30 serves to induce the flow of fluid through the hose 26 and to the nozzle 22 for discharge into the carburetor 12 in a manner described in more detail below.

The electric motor 32 is connected to and driven by an amplifier circuit 36 which is connected to the motor by a conductor 37. The amplifier circuit 36, in turn, is powered by a vehicle battery 38 and is connected thereto by a conductor 40, it being understood that this connection can be through the vehicle ignition switch so that the amplifier circuit is activated only when the ignition is turned on by the operator of the vehicle. The amplifier circuit 36 is also connected, via a conductor 42, to a distributor 44 mounted on the engine 10. The distributor 44 includes a plurality of spark plug ignition wires 46 which are partially shown in the interest of clarity, and the conductor 42 is coupled to one of these wires in a manner to be described in detail later.

A control unit 50 is mounted on the engine block and is connected to the amplifier circuit 36 by a conductor 52. It is understood that the control unit 50 includes a temperature responsive probe or thermostat (not shown) for responding to engine temperature, in a conventional manner, and functions to selectively activate and deactivate the electric motor 32 and the air pump 30, as will be described in detail later.

Figure 2:
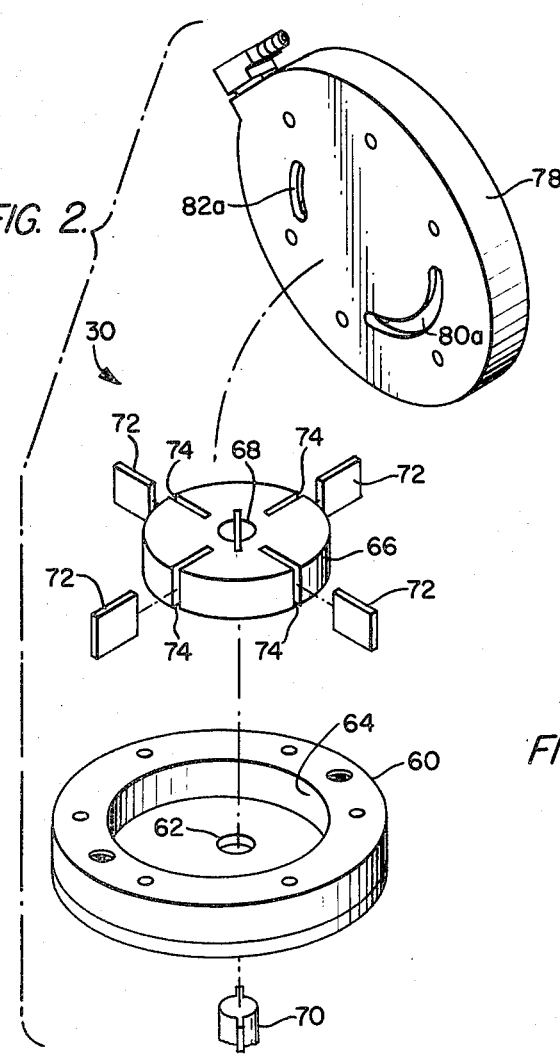
FIG. 2 is an exploded perspective view depicting the air pump of the system of FIG. 1.
Figure 3:
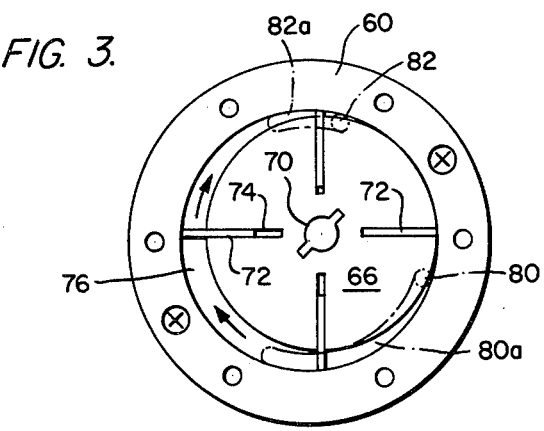
FIG. 3 is a plan view of a portion of the pump of FIG. 2.

The air pump 30, as shown in detail in FIGS. 2 and 3 is of the moving vane-type and includes a cylindrical body member 60 having an eccentric opening 62 and a cylindrical recessed portion 64. A rotor 66 is disposed within the recessed portion 64 and has a central opening 68 which registers with the eccentric opening 62 in the body member 60. A coupler 70 extends through both openings 62 and 68 and connects the output shaft (not shown) of the motor 32 to the rotor 66 to rotate the latter relative to the body member 60. Four blades 72 loosely fit within a corresponding number of radially extending slots 74 formed in the rotor 68. As shown in FIG. 3, as a result of the eccentric disposition of the opening 62 in the body member 60 and the resulting eccentric disposition of the rotor 66 in the recessed portion 64, an elongated, curved pumping chamber 76 is defined between the outer surface of the rotor and the inner surface of the wall defining the recessed portion 64, which chamber varies in size along its length, as shown.

A cylindrical cover 78 extends over the body member 60 to enclose the rotor 66 and is fastened to the body member by suitable bolts (not shown) extending through corresponding openings formed in the cover and the body member. As better shown in FIG. 4, which depicts the upper surface of the cover 78, an air inlet opening 80 and an air outlet opening 82 are provided through the cover 78 which register with slots 80a and 82a, respectively, formed in the lower surface of the cover 78 (FIG. 2). The slots 80a and 82a, which are also shown by the dashed lines in FIG. 3, in turn, register with the respective ends of the chamber 76. As a result, when the rotor 66 is rotated by the motor 32 in the direction shown by the arrows in FIG. 3, the blades 72 move out from their slots 74 by centrifugal force when they sweep through the chamber 76 and create a pumping action that draws air in through the inlet opening 80 and the slot 80a and pumps the air through the chamber 76 and out through the slot 82a and the outlet opening 82 with the air delivery rate being proportional to pump speed.

Figure 4:
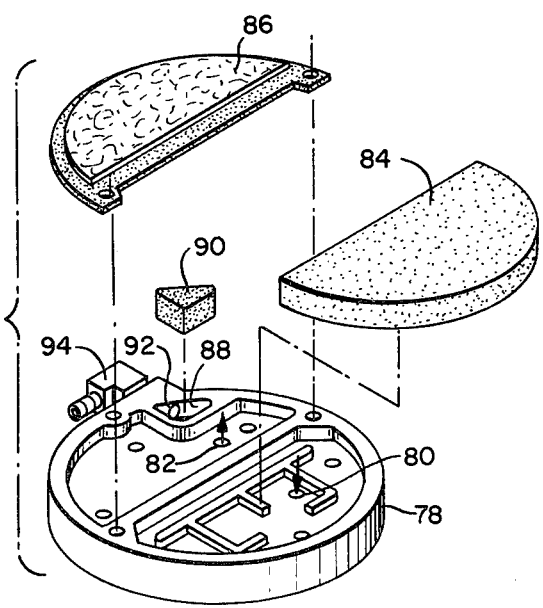
FIG. 4 is an exploded perspective view of additional components of the pump of FIG. 2.

As shown in FIG. 4, the upper surface of the cover 78 is configured with appropriate ribs and recessed portions to receive an air filter 84 for filtering the incoming air, and a filter assembly 86 for filtering the air discharging from the outlet opening 82. A discharge chamber 88 is defined in the upper surface of the cover 78 and receives a lint filter 90. An outlet passage 92 registers with the chamber 88 and with an outlet fitting 94 which is connected to the hose 28 supplying air to the nozzle 22. It is understood that a filter cover (not shown) extends over the filter 84 and the filter assembly 86 so that air discharging from the outlet opening 82 and passing through the filter assembly 86 is directed back through the filter 90 and the discharge passage 92 for discharge from the fitting 94. The filter cover can be provided with a fitting which connects to a hose 96 (FIG. 1) which communicates, via a suitable fitting, with the intake manifold 14 of the engine 10 to supply air (with a relatively small amount of fuel vapor) to the inlet opening 80. As a result, upon actuation of the pump 30 by the motor 32, a quantity of air is drawn from the intake manifold through the hose 96 and into the pump 30. Since the pressure of the air in the intake manifold is proportional to the load on the engine, the air introduced to the pump 30 will also be at a pressure that is proportional to engine load. The air is then pumped through the hose 28 and into and through the nozzle 22 which induces a flow of water through the nozzle and into the carburetor 12 as discussed above.

Figure 5:
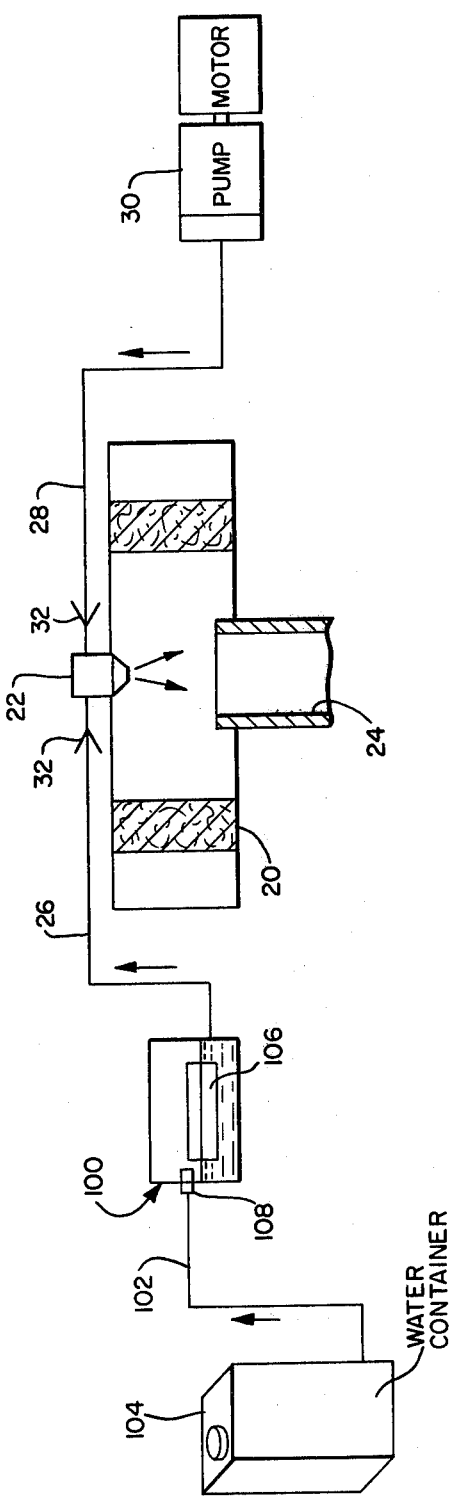
FIG. 5 is a schematic representation of a portion of the fluid injection system of FIG. 1.

As shown in FIG. 5, the supply hose 26 of the nozzle 22 is connected to a float-bowl reservoir 100 which, in turn, is connected through a supply line 102 to a fluid container 104. The float-bowl reservoir 100 includes a float 106 that operates an inlet valve 108, which can be of the needle valve type, to maintain a uniform level of cooling fluid within the reservoir 100 in a conventional manner. In the preferred embodiment, the fluid is in the form of water, or water in solution with other substances, such as methanol or alcohol, and the container 104 is provided with a pump (not shown) for pumping the fluid to the reservoir 100. Also, the float 106 is located at a selected elevation below the elevation of the nozzle 22 to prevent the fluid from unintentionally flowing under the influence of gravity to and through the nozzle 22. The reservoir 100, while not necessary to the operation of the system of the present invention, permits the supply container 104 to be located remotely from the engine 10 at a convenient elevation relative to the nozzle 22.

Figure 7:
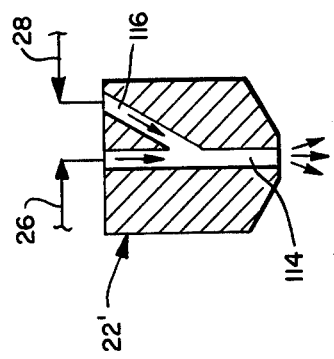
FIGS. 6 and 7 are cross-sectional views of two exemplary fluid injection nozzles suitable for use with the system of the present invention.
Figure 6:
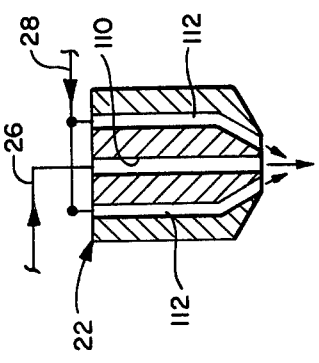

The nozzle 22 is adapted to provide a downwardly directed and preferably diverging flow of finely divided fluid droplets in response to the flow of air through the nozzle. While many different types of nozzles are suitable for use with the present invention, a preferred embodiment of the nozzle is shown in FIG. 6. This embodiment includes a central bore 110 for receiving the fluid from the hose 26 and a plurality of circumferentially arranged atomizing air supply channels 112 for receiving air from the hose 28 and for directing the flow of air to the outlet of the bore 110. The flow of air past the outlet of the bore 110 creates a low pressure zone which induces, or draws, fluid from the hose 26 through the bore 110 in a conventional manner, where it is mixed with, and atomized by, the air before passing into the inlet 24 of the carburetor 12. In the alternative, a nozzle 22' of the type shown in FIG. 7 may be provided which has a central bore 114 connected to the fluid supply hose 26 and an air-injection channel 116 connected to the air supply hose 28 that opens into the central bore 114 at an acute angle to effect the induction and atomizing function.

As discussed in connection with FIG. 1, an end of the conductor 42 is wound around a spark plug wire 46 to inductively couple the amplifier circuit 36 to the wire 46. As a result, the firing, or pulse rate of the spark plug is picked up as an electronic signal by the conductor 42 which signal varies in frequency in response to the speed of the engine and is amplified by the amplifier circuit 36 in a manner to be described in detail later. Since the electric motor 32 is driven by the output of the amplifier circuit 36 and since the latter operates in response to signals from the spark plug wire 46, it can be appreciated that the pump 30 will operate in response to the speed of the engine. Also, since the inlet of the pump 30 is connected to the intake manifold 14 which contains a mixture of air and a negigible amount of fuel vapor, the pressure of which mixture varies in response to variations in engine load, the operation of the pump 30 will also vary in response to engine load.

Figure 8:
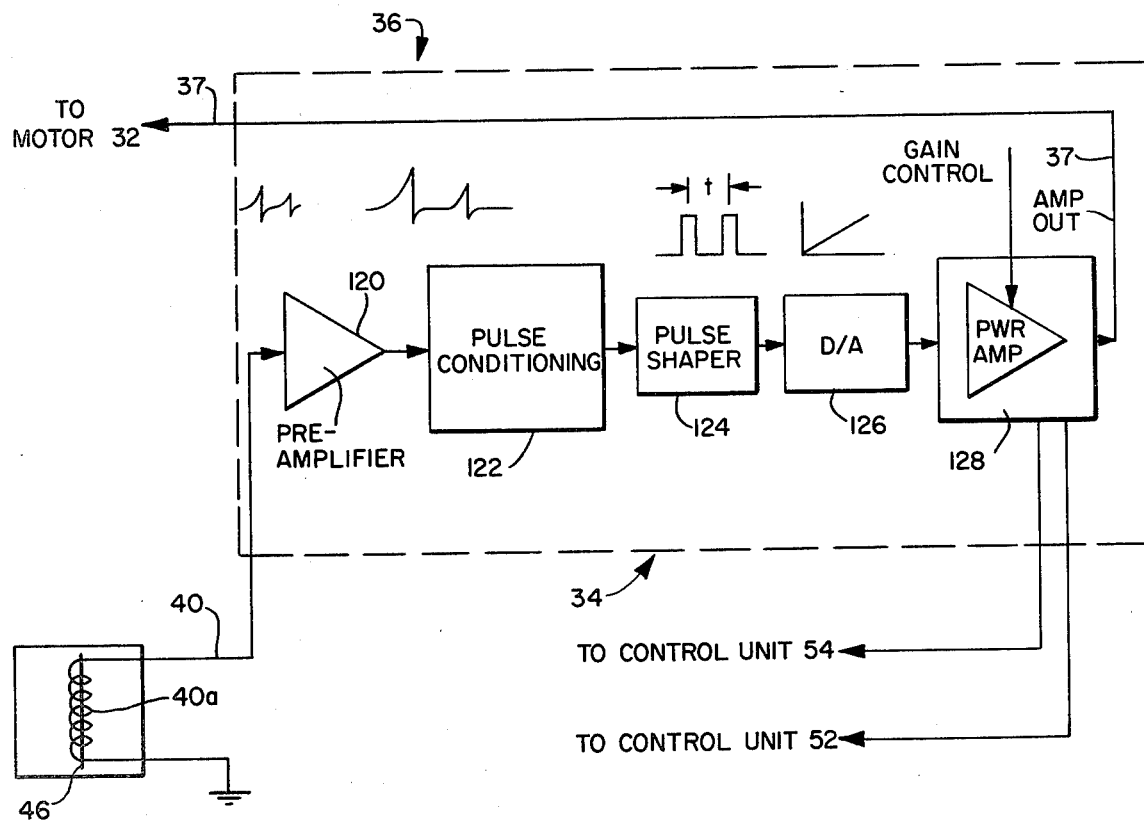
FIG. 8 is a block diagram of the amplifier circuit utilized in the system of the present invention with representative waveforms for the various stages depicted in the diagram shown superposed on the diagram.

The amplifier circuit 36 is shown in block form in FIG. 8 with the battery 38 and its connections to the circuit being omitted in the interest of clarity. The amplifier circuit 36 includes the aforementioned conductor 42 whose end portion is coupled to one of the secondary ignition wires 46 of the distributor 44. In the preferred form, the conductor 46 includes a plurality of wire turns wrapped around the selected ignition wire 44 to form an inductive pick-up 42a which provides a signal that is representative of the electrical potential developed across the spark plug gap prior to and during firing. A series of representative signals is shown superposed on the circuit of FIG. 8 with each signal including an intitial rising portion, a straight, vertically-extending, intermediate discharge portion and a terminal portion located below the initial rising portion. The initial rising portion represents the build-up in potential across the spark plug gap prior to firing, the intermediate straight portion represents the breakdown or discharge during firing, and the terminal portion represents the inductive ringing of the secondary circuit after discharge, as is known in the art.

The pick-up 42a provides the ignition signal pulses to a preamplifier 120 which then provides amplified signals to a pulse conditioner 122 which includes filtering and limiting circuits. The pulse conditioner 122 provides conditioned pulses to a pulse shaper 124 (e.g., a Schmidt trigger or mono-stable multivibrator) which provides uniformly shaped pulses at a pulse repetition rate that varies in response to the engine speed. The output of the pulse shaper 124 is provided to a digital-to-analog converter (D/A) 126 which provides a direct current output that is directly proportional to the pulse repetition rate at its input. The direct current output of the converter 126 is amplified through a power amplifier 128 with the amplified voltage being provided to the motor 32 through the conductor 37. The motor 32 of the type that responds in a generally proportional manner to varying DC input voltage, e.g., a series-wound universal motor which rotates in response to the output of power amplifier 128 with the motor speed varying in response to the engine speed. Since the rotor 66 of the pump 30 is coupled, via the coupler 70 to the output shaft of the motor 32, the pump 30 will thus provide an air flow along the hose 28 to the nozzle 22 that is in proportion to the engine speed, which air flow induces a proportional amount of fluid through the hose 26 into the inlet opening 24 of the carburetor 12. The amplifier 128 is provided with a variable gain control so that the input/output gain of the amplifier can be adjusted to suit the operating requirements of a particular engine.

As indicated above, the control unit 50 operates to deactivate the power amplifier 128 and therefore the electric motor 32 and the pump 30 under selected operation conditons of the engine 10. More particularly, the pump 30 is deactivated by the control unit 50 during cold starts, and continues this in mode until the engine temperature reaches a preselected value at which time the control unit 50 functions to place the pump in the activated state under control of the amplifier as described above.

In operation, upon turning on the ignition switch, and starting the engine the amplifier circuit 36 receives pulse signals from the spark plug wire 46 via the pick-up 42a and the conductor 42, with the pulse rate being responsive to engine speed as described above. The amplifier circuit 36 amplifies these signals and powers the electric motor 32 which, in turn, rotates the rotor 66 of the pump 30 to draw air (mixed with a small amount of fuel vapor) in from the intake manifold 14 via the line 96, where it is pressurized and passed to the nozzle 22 via the line 28. Since the inlet of the pump 30 is connected to the intake manifold 14 and therefore receives the air at a pressure that varies with engine load, the amount of air pumped to and through the nozzle 22, and therefore the corresponding flow of fluid from the hose 26 through the nozzle and into the inlet opening 24 of the carburetor 12, vary in response to engine speed and engine load. Since the air passing through the nozzle 22 is at a much higher pressure and flow rate when compared to the water, a relatively high volume of air is thus used to control a much smaller volume of water, which enables a very precise metering of the water to be obtained.

Of course, during times that the amplifier 128, and therefore the air pump 30, is deactivated by the control unit 50, (that is, during starting and warming up of the engine), the flow rate of the atomizing air through the nozzle 22, and the resulting injection of water into the carburetor 12, is terminated.

As a result of the foregoing, the fluid injection system of the present invention operates only at times which are optimum as determined by the critical operating modes of the engine. This, plus the precise metering of the water that is achieved by the system of the present invention, results in a dramatic increase in engine efficiency.

It is noted that reference has been made to the term "air" in the foregoing specification notwithstanding the fact that the fluid received by the pump 30 from the intake manifold 14 and pumped to and through the nozzle 22 is, in fact, a mixture of air and fuel vapor. However, the amount of fuel vapor compared to the amount of air is relatively small and does not effect the operation of the system of the present invention, nor the engine, in any manner.

While the preferred embodiment of the fluid injection system of the present invention has been shown in combination with the engine illustrated in FIG. 1, as will be apparent to those skilled in the art, the fluid injection system can be applied to any one of a plurality of different types of engines including 4-cylinder, 6-cylinder and V-8 engines. Also, the present invention is not limited to use with engines having a carburetor for mixing air and fuel but can easily be adapted to fuel injection and stratified charge engines by directing the cooling fluid directly into the cylinder of the engine through an appropriate inlet. The system of the present invention is particularly suitable for use with super-charged engines since the injection of water increases in proportion to increases in the pressure in the intake manifold. Also, although reference has been made to the terms "cooling fluid", "water", and "water in solution", it is understood that other types of fluids can be injected that affect the combustion process, such as octane improvers, anti-detonates, and oxygen additives, etc.

Still other variations in the foregoing can be made within the scope of the invention. For example, although reference is made to the use of hoses to connect the various components in fluid flow communication, it is understood that other conduits such as tubing, pipes, etc. can be used. Also, a demand regulator, or the like, can be provided in place of the float-bowl reservoir 100 to provide the fluid to the hose 26. Further, the position and location of the nozzle 22 can be varied as long as it is effective to introduce the fluid into the intake air side of the engine 10. Also, the amplifier circuit 36 can be connected, via the conductor 42, to the high tension coil wire of the distributor 44 rather than to a spark plug ignition wire as described above. Further, other types of secondary ignition pick-ups, including capacitive pick-ups and direct connections through high impedances are suitable. Still further, variations in the electronic circuit disclosed above can be made as long as the circuit responds to the input signals and produces the same type of output signals as disclosed above. Still further, other types of air pumps, other than the particular vane pump described above, can be used in the system of the present invention.

As also will be apparent from those skilled in the art, still other changes and modifications may be made to the water injection system of the present invention without departing from the spirit and scope of the invention and recited in the appended claims and their legal equivalent.

What is claimed is:

1. A system for injecting fluid into a cylinder of an internal combustion engine having an ignition system and an intake manifold, said fluid injecting system comprising first means for introducing air to a supply of said fluid for injecting said fluid into said cylinder at a rate proportional to the flow of said air, and second means in a responsive relation to said ignition system and to said intake manifold for responding to engine speed related signals from said ignition system and to engine load related signals from said intake manifold for introducing air to said first means at a flow that varies in response to engine speed and engine load.

2. The system of claim 1 wherein said first means comprises a nozzle connected to a source of fluid and means connecting said nozzle to said second means, said nozzle including fluid and air flow passages formed and arranged in a manner to draw said fluid from said supply of fluid and through said fluid flow passage in response to the flow of air through said air flow passage.

3. The system of claim 2 wherein said fluid and air flow passages are further formed and arranged to mix said fluid and air upon their discharge from said nozzle.

4. The system of claim 1 wherein said second means comprises means for receiving air and for pressurizing said air.

5. The system of claim 4 wherein said means for receiving and pressurizing said air comprises an air-injection pump and an electrical motor drivingly connected to said pump.

6. The system of claim 4 wherein said second means further comprises means connecting said air pressurizing means to said intake manifold to introduce said air to said air pressurizing means at a pressure that varies in response to engine load.

7. The system of claim 5 wherein said second means comprises an amplifier circuit connecting said electrical motor to said ignition system for responding to engine speed related signals from said ignition system and varying the speed of said motor accordingly.

8. The system of claim 7 wherein said amplifier circuit comprises electrical conductor means coupled to said ignition system for receiving said signals, an electric amplifier for amplifying said signals and means electrically connecting said amplifier to said motor.

9. The system of claim 8 wherein said electrical conductor means is inductively coupled to a spark plug wire of said ignition system so that the pulse rate of said signals is in proportion to engine speed.

10. The system of claim 9 wherein said amplifier powers said motor at a predetermined rate that varies in response to changes in said pulse rate of said signals.

11. The system of claim 10 further comprising means for varying the gain of said amplifier and therefore the speed of said motor and the flow of said air.

12. The system of claim 7 further comprising an electronic temperature sensing circuit responsive to the temperature of said engine and electrically connected to said amplifier circuit for deactivating said latter circuit and therefore said motor and said air pressurizing means in response to the temperature of said engine being below a predetermined value.

13. The system of claim 1 further comprising means for deactivating said second means in response to the temperature of said engine being below a predetermined value.

14. The system of claim 1 wherein said air contains a relatively small volume of fuel vapor from said intake manifold.

15. The system of claim 1 wherein said engine includes a carburetor which receives said fluid before it is injected into said cylinder.

* * * * *